(12) United States Patent
Yokoi (10) Patent No.: US 9,749,045 B2
(45) Date of Patent: Aug. 29, 2017

(54) VISIBLE RAY COMMUNICATION SYSTEM, TRANSMISSION APPARATUS, AND SIGNAL TRANSMISSION METHOD

(75) Inventor: Atsuya Yokoi, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/131,224

(22) PCT Filed: Nov. 24, 2009

(86) PCT No.: PCT/KR2009/006923
§ 371 (c)(1),
(2), (4) Date: May 25, 2011

(87) PCT Pub. No.: WO2010/062094
PCT Pub. Date: Jun. 3, 2010

(65) Prior Publication Data
US 2011/0229130 A1   Sep. 22, 2011

(30) Foreign Application Priority Data
Nov. 25, 2008 (JP) ................... 2008-298941

(51) Int. Cl.
*H04B 10/116* (2013.01)
*H04B 10/11* (2013.01)
(Continued)

(52) U.S. Cl.
CPC ............ *H04B 10/116* (2013.01); *H04B 10/11* (2013.01); *H04B 10/112* (2013.01); *H04B 10/114* (2013.01); *H04B 10/50* (2013.01)

(58) Field of Classification Search
CPC .................................................. H04B 10/116
See application file for complete search history.

(56) References Cited

U.S. PATENT DOCUMENTS 5,610,748 A * 3/1997 Sakanaka et al. ............ 398/130
7,099,589 B1 * 8/2006 Hiramatsu ..................... 398/127
(Continued)

FOREIGN PATENT DOCUMENTS

JP      11-234232       8/1999
JP      2000-124860     4/2000
(Continued)

OTHER PUBLICATIONS from the European Patent Office, Annex to Communication pursuant to Article 94(3) EPC, Application No. 09 829 301.2, Dated Sep. 26, 2016, 3 pages.*

(Continued)

*Primary Examiner* — Darren E Wolf
(74) *Attorney, Agent, or Firm* — The Farrell Law Firm, P.C.

(57) ABSTRACT

Disclosed is a visible ray communication system including a transmission apparatus and a reception apparatus, wherein the transmission apparatus includes: a plurality of light emitting devices; an S/P converter for serial-to-parallel converting transmission data, thereby generating N data streams; a modulator for modulating the generated N data streams for respective carriers with a predetermined number of dimensions, thereby generating N modulated signals; a carrier signal multiplier for multiplying the generated N modulated signals by orthogonal N carrier signals, respectively, thereby generating N transmission signals; and a light emitting control unit for illuminating the plurality of light emitting devices according to the generated N transmission signals.

8 Claims, 6 Drawing Sheets

(51) Int. Cl.
*H04B 10/12* (2006.01)
*H04B 10/114* (2013.01)
*H04B 10/50* (2013.01)
*H04B 10/112* (2013.01)

(56) References Cited

U.S. PATENT DOCUMENTS

| | | | |
|---|---|---|---|
| 8,073,147 B2* | 12/2011 | Sugiyama | H04B 3/23 370/286 |
| 2004/0223763 A1* | 11/2004 | Lee et al. | 398/78 |
| 2006/0239689 A1* | 10/2006 | Ashdown | 398/130 |
| 2009/0067846 A1* | 3/2009 | Yu et al. | 398/128 |
| 2009/0154934 A1* | 6/2009 | Jiang | H04B 10/40 398/135 |
| 2009/0220239 A1* | 9/2009 | Armstrong et al. | 398/81 |

FOREIGN PATENT DOCUMENTS

| | | |
|---|---|---|
| JP | 2003-318836 | 11/2003 |
| JP | 2004-336784 | 11/2004 |
| JP | 2005354553 A | 12/2005 |
| JP | 2006-092486 | 4/2006 |
| JP | 2007-082098 | 3/2007 |
| JP | 2008252444 A | 10/2008 |
| KR | 1020040095107 | 11/2004 |
| KR | 1020080066893 A | 7/2008 |
| WO | WO2007043789 A1 | 4/2007 |
| WO | WO 2008/129743 A1 * | 10/2008 ........... H04B 10/152 |

OTHER PUBLICATIONS

PCT/ISA/237 Written Opinion issued on PCT/KR2009/006923 (3 pp.).

PCT/ISA/210 Search Report issued on PCT/KR2009/006923 (3 pp.).

Korean Office Action dated Oct. 1, 2015 issued in counterpart application No. 10-2011-7012806, 9 pages.

* cited by examiner

VISIBLE RAY COMMUNICATION SYSTEM, TRANSMISSION APPARATUS, AND SIGNAL TRANSMISSION METHOD

PRIORITY

This application claims priority under 35 U.S.C. §365(c) to International Application No. PCT/KR2009/006923 filed in the Korean Intellectual Property Office (RO/KR) on Nov. 24, 2009, and priority under 35 U.S.C. §119(a) to Patent Application No. 2008-298941 filed in the Japanese Patent Office on Nov. 25, 2008, the entire disclosures of which are incorporated herein by reference.

BACKGROUND OF THE INVENTION

1. Field of the Invention

The present invention relates generally to a visible ray communication system, a transmission apparatus, and a signal transmission method.

2. Description of the Related Art

An optical communication technology using light in a visible ray region has recently been explored. In particular, as an illuminating device using a luminous element, such as an Light-emitting Diode (LED) Light-emitting, has rapidly come into use, development of technology for achieving higher speed, convenient data communication by utilizing an infrastructure, such as an interior/exterior illuminating device, has been carried out.

As a light-emitting device used for high-speed optical data communication, an LED is the most powerful candidate in consideration of an influence on a human body or medical appliances. A semiconductor light-emitting device with a higher speed response performance, such as a Laser Diode (LD) or a Super Luminescent Diode (SLD), is proposed as a candidate. The data transmission speed in the optical communication depends on a response speed of a light-emitting device. Thus, such a light-emitting device with a higher speed response performance is required.

Also, in order to further improve the data transmission speed, a technology for transmitting a large amount of data during one signal emitted from a light-emitting device in a stable manner is required. One example of optical communication technology, Japanese Patent Laid-Open Publication HEI 2008-252444, which discloses a technology of removing spatial interference by allocating a time axis of an Orthogonal Frequency-Division Multiplexing (OFDM) signal in a spatial direction.

When OFDM is used, it is possible to improve the frequency use efficiency and the endurance against multipath. Thus, the OFDM is widely used in a wireless communication system (e.g., a wireless LAN) or a wired communication system (e.g., Asymmetric Digital Subscriber Line (ADSL)). In visible ray communication, the communication quality is expected to be improved by the application of OFDM. However, in OFDM, there is a problem in that a Peak to Average Power Ratio (PAPR) is increased. In other words, a large dynamic range is required in a transmitter and a receiver.

Accordingly, when OFDM is applied to visible ray communication, a very large current flows in an LED, as a transmission device of the visible ray communication. For example, in an LED, a current ranging from several hundred milliAmps (mA) to several Amps (A) flows. For this reason, a drive circuit capable of covering a signal with a very wide dynamic range in a transmission-side is necessary. However, in general, an LED is used for emitting light with a predetermined quantity, and, thus, is actually not appropriate for handling such a wide dynamic range signal because it requires a special element.

SUMMARY OF THE INVENTION

Accordingly, the present invention has been made to solve the above-mentioned problems occurring in the prior art, and the present invention provides a visible ray communication system, a transmission apparatus, and a signal transmission method, in which the performance requirement for a high dynamic range is not imposed on a light-emitting device, the improvement of communication quality, similar to that achieved by OFDM, can be achieved, and more data can be transmitted with a predetermined number of multiplexing processes.

In accordance with an aspect of the present invention, a visible ray communication system including a transmission apparatus and a reception apparatus, wherein the transmission apparatus is provided including: a plurality of light-emitting devices; a Serial-to-Parallel (S/P) converter for serial-to-parallel converting transmission data, thereby generating N data streams; a modulator for modulating the N data streams generated by the S/P converter for respective carriers with a predetermined number of dimensions, thereby generating N modulated signals; a carrier signal multiplier for multiplying the N modulated signals generated by the modulator by N orthogonal carrier signals, respectively, thereby generating N transmission signals; and a light-emitting control unit for illuminating the plurality of light-emitting devices according to the N transmission signals generated by the carrier signal multiplier, and the reception apparatus includes: a light-receiving device for receiving lights, the lights being emitted from the plurality of light-emitting devices of the transmission apparatus and spatially multiplexed in a transmission medium, thereby outputting reception signals according to corresponding reception intensities; an Fast Fourier Transform (FFT) unit for performing FFT on the reception signals output from the light-receiving device by using the N carrier signals, thereby extracting the N modulated signals of the respective carriers; and a demodulator for demodulating each of the modulated signals extracted from the FFT unit.

Through the application of the above described configuration, it is possible to achieve the improvement of communication performance, similar to that achieved by OFDM. For example, it is possible to improve the frequency use efficiency and achieve the improvement of communication quality without imposing a performance requirement for a high dynamic range upon a light-emitting device.

Also, when a number N of the light-emitting devices is greater than a number n of the carrier signals (N>n), the light-emitting control unit may illuminate multiple devices of the light-emitting devices at once based on one of the transmission signals. When a number N of the light-emitting devices is less than a number n of the carrier signals (N<n), the light-emitting control unit may add M ($2 \leq M < n$) signals of the transmission signals, and illuminate the light-emitting devices based on the transmission signals obtained through the addition.

In accordance with another aspect of the present invention, there is provided a transmission apparatus including: a plurality of light-emitting devices; an S/P converter for serial-to-parallel converting transmission data, thereby generating N data streams; a modulator for modulating the N data streams generated by the SIP converter for respective carriers with a predetermined number of dimensions, thereby generating N modulated signals; a carrier signal multiplier for multiplying the N modulated signals generated by the modulator by N carrier signals orthogonal to the N modulated signals, respectively, thereby generating N transmission signals; and a light-emitting control unit for illuminating the plurality of light-emitting devices according to the N transmission signals generated by the carrier signal multiplier.

Through the application of the above-described configuration, it is possible to achieve the improvement of communication performance, similar to that achieved by OFDM. For example, it is possible to improve the frequency use efficiency and achieve the improvement of communication quality without imposing a performance requirement for a high dynamic range upon a light-emitting device.

Also, a transmission signal generated by multiplication of each carrier signal is not multiplexed within a transmission apparatus, and is directly transmitted by each light-emitting device. Accordingly, compared to the case where N transmission signals are multiplexed and then transmitted, it is possible to control the dynamic range required for a light-emitting device, and a light-emitting control unit to be low. As a result, for the light-emitting device or the light-emitting control unit, a relatively inexpensive LED (or an LED driving circuit) may be used, and the manufacturing cost of a transmission apparatus can be reduced. In general, it would be difficult for an LED (or an LED driving circuit) used for a general illuminating device to satisfy the performance requirement for a high dynamic range. However, in the above-described configuration of a transmission apparatus, since the performance requirement for a dynamic range is controlled to be low, it is possible to use a conventional infrastructure.

In accordance with a further aspect of the present invention, there is provided a signal transmission method including the steps of: S/P converting transmission data by a transmission apparatus including a plurality of light-emitting devices, thereby generating N data streams; modulating the generated N data streams for respective carriers with a predetermined number of dimensions, by the transmission apparatus, thereby generating N modulated signals; multiplying the generated N modulated signals by N orthogonal carrier signals, respectively, by the transmission apparatus, thereby generating N transmission signals; illuminating the plurality of light-emitting devices according to the generated N transmission signals by the transmission apparatus; performing, by a reception apparatus including a light-receiving device for receiving light emitted from the plurality of light-emitting devices of the transmission apparatus and outputting reception signals according to corresponding reception intensities, the lights being spatially multiplexed in a transmission medium, FFT on the reception signals output from the light-receiving device by using the N carrier signals, thereby extracting the N modulated signals of the respective carriers; and demodulating each of the extracted modulated signals.

Through the application of the above-described method, it is possible to achieve the improvement of communication performance, similar to that achieved by OFDM. For example, it is possible to improve the frequency use efficiency and achieve the improvement of communication quality without imposing a performance requirement for a high dynamic range upon a light-emitting device.

Also, a transmission signal generated by multiplication of each carrier signal is not multiplexed within a transmission apparatus, and is directly transmitted by each light-emitting device. Accordingly, compared to the case where N transmission signals are multiplexed and then transmitted, it is possible to control the dynamic range required for a light-emitting device, and a light-emitting control unit to be low. As a result, for the light-emitting device or the light-emitting control unit, a relatively inexpensive LED (or an LED driving circuit) may be used, and a manufacturing cost of a transmission apparatus can be reduced. In general, an LED (or an LED driving circuit) used for a general illuminating device can hardly satisfy the performance requirement for a high dynamic range. However, in the above-described configuration of a visible ray communication system, since the performance requirement for a dynamic range is controlled to be low, it is possible to achieve the system configuration by using a conventional infrastructure.

In accordance with a still further aspect of the present invention, there is provided a signal transmission method by a transmission apparatus including a plurality of light-emitting devices, the method including the steps of: serial-to-parallel converting transmission data, thereby generating N data streams; modulating the generated N data streams for respective carriers with a predetermined number of dimensions, thereby generating N modulated signals; multiplying the generated N modulated signals by N carrier signals orthogonal to the N modulated signals, respectively, thereby generating N transmission signals; and illuminating the plurality of light-emitting devices according to the generated N transmission signals.

Through the application of the above-described method, it is possible to achieve the improvement of communication performance, similar to that achieved by OFDM. For example, it is possible to improve the frequency use efficiency and the endurance against multi-path.

Also, a transmission signal generated by multiplication of each carrier signal is not multiplexed within a transmission apparatus, and is directly transmitted by each light-emitting device. Accordingly, compared to the case where N transmission signals are multiplexed and then transmitted, it is possible to control the dynamic range required for a light-emitting device, and a light-emitting control unit to be low. As a result, for the light-emitting device or the light-emitting control unit, a relatively inexpensive LED (or an LED driving circuit) may be used, and a manufacturing cost of a transmission apparatus can be reduced. In general, an LED (or an LED driving circuit) used for a general illuminating device can hardly satisfy the performance requirement for a high dynamic range. However, in the above-described configuration of a transmission apparatus, since the performance requirement for a dynamic range is controlled to be low, it is possible to use a conventional infrastructure.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings. Here, in this specification and drawings, repeated description of constituents having substantially the same functional configurations will be omitted by allotting the same reference numerals.

Hereinafter, the sequence of explanation on embodiments of the present invention, which will be described later, is as follows. First, the configuration of an OFDM-using visible ray communication system LS1 will be described with reference to FIG. 1. in particular, some problems caused by the application of OFDM in a visible ray communication system will be described. Then, the configuration of a visible ray communication system LS2 according to an embodiment of the present invention will be described with reference to FIG. 2. Then, visible ray communication systems LS3 and LS4 according to modified embodiments of the embodiment will be described with reference to FIGS. 3 and 4.

Hereinafter, before a detailed description on the technology of one embodiment of the present invention is given, some problems to be solved by the embodiment will be summarized.

Configuration of a Visible Ray Communication System LS1

Figure 1:
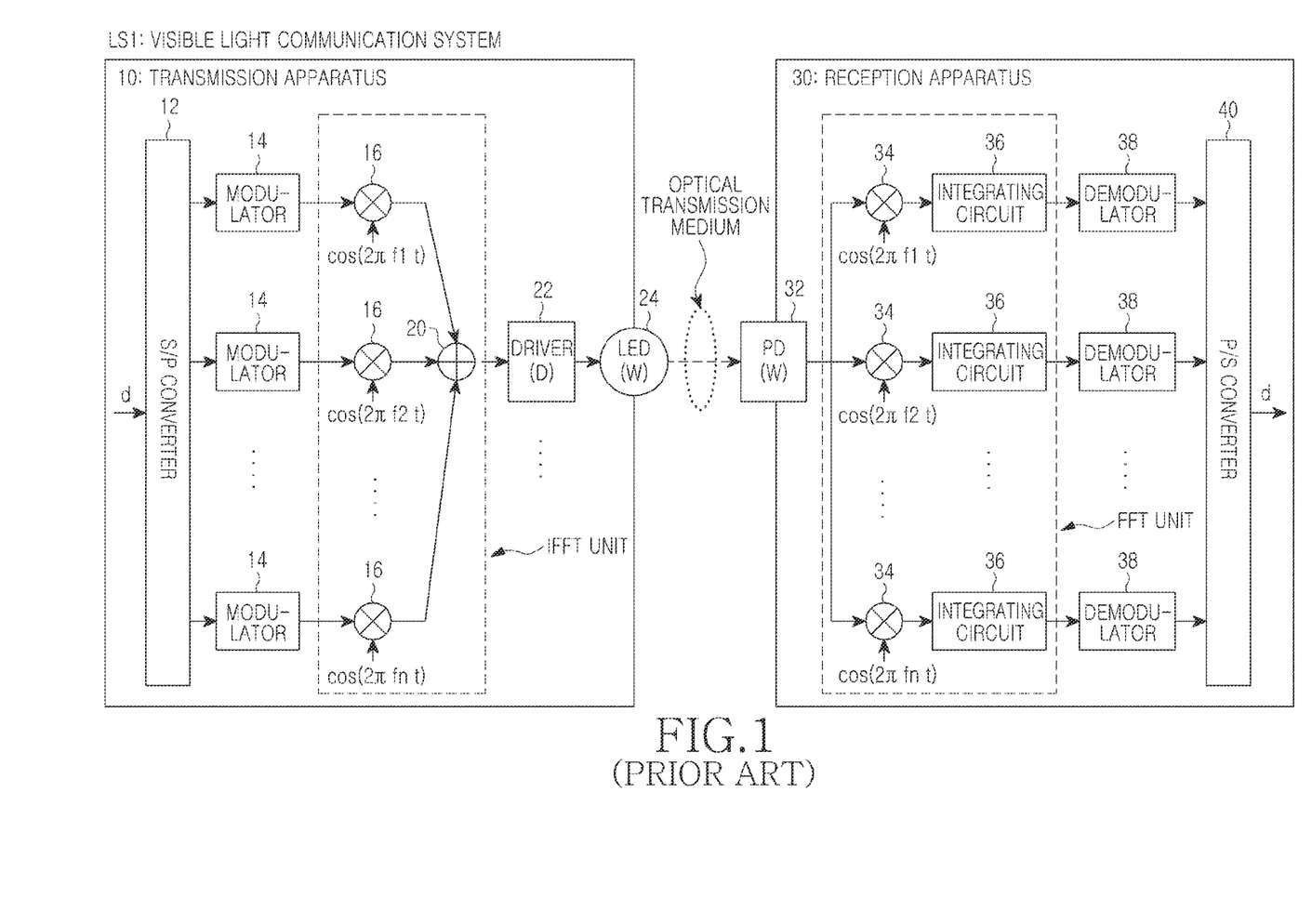
FIG. 1 illustrates an example of the configuration of a visible ray communication system using OFDM.

First, the configuration of a visible ray communication system LS1 will be described in detail with reference to FIG. 1, and problems caused by the application of the configuration will be summarized. FIG. 1 illustrates an example of the configuration of an OFDM-using visible ray communication system LS1.

As shown in FIG. 1, a visible ray communication system LS1 includes a transmission apparatus 10, and a reception apparatus 30. The transmission apparatus 10 has an S/P converter 12, a modulator 14, an Inverse Fast Fourier transform (IFFT) unit, a driver circuit 22, and a light-emitting device 24. The IFFT unit includes a multiplier 16 and an adder 20. The reception apparatus 30 has a light-receiving device 32, an FFT unit, a demodulator 38, and a PIS converter 40. Herein, the FFT unit includes a multiplier 34, and an integrating circuit 36.

Transmission data D is converted from serial to parallel converted from serial to parallel by the S/P converter 12. S/P converter 12 outputs data streams equal to the number of carriers. In the following description, the number of carriers is n. The data stream corresponding to each carrier, output from the S/P converter 12, is modulated with a pre-determined number of dimensions (for example, 2) by the modulator 14. The modulator 14 outputs a modulated signal. The modulated signal of each carrier, output from the modulator 14, is input to the IFFT unit. Thus, modulated signals are input, to the IFFT, equal to the number of the carriers. The IFFT unit is a device for performing IFFT on the input modulated signals equal to the number of carriers. First, the modulated signals input to the IFFT unit are multiplied by carrier sinusoidal (sine wave) signals in the multiplier 16.

Herein, n carrier sinusoidal signals $\cos(2\pi f_1 t) \sim \cos(2\pi f_n t)$ corresponding to carrier frequencies $f_1 \sim f_n$, which are orthogonal to each other. Each modulated signal (hereinafter, a carrier signal), which has been multiplied by the carrier sinusoidal signal, is input to the adder 20. In the adder 20, respective carrier signals are added to each other to generate OFDM signals.

An OFDM signal generated by the adder 20 is input to the driver circuit 22. The driver circuit 22 is a drive circuit for driving the light-emitting device 24 (LED(W)). When the OFDM signal is input, the driver circuit 22 controls the current quantity supplied to the light-emitting device 24 based on the input OFDM signal, and emits the light of the light-emitting device 24 with the emission intensity according to the signal amplitude of the OFDM signal. The light generated by the light-emitting device 24 is received by the light-receiving device 32 of the reception apparatus 30. The light-receiving device 32 is a photoelectric converting element. For this reason, when the light is received by the light-receiving device 32, an electrical signal (hereinafter, referred to as a reception signal) according to the intensity of the received light is output. The reception signal output from the light-receiving device 32 is input to the FFT unit. The FFT unit is a device for performing FFT on the reception signal to extract each carrier frequency component.

The reception signal output from the light-receiving device 32 is input to the multiplier 34, and is multiplied by a carrier sinusoidal signal corresponding to each of carrier frequencies $f_1 \sim f_n$. The reception signal, which has been multiplied by each carrier sinusoidal signal in the multiplier 34, is input to the integrating circuit 36. In the integrating circuit 36, the signal output from the multiplier 34 is subjected to an integrating operation in an integration interval up to an OFDM symbol length (T) on a time axis, and a signal component corresponding to each of carrier frequencies $f_1 \sim f_n$ is extracted. Each carrier frequency component extracted from the integrating circuit 36 is input to the demodulator 38. Each carrier frequency component corresponds to each carrier signal. For this reason, when each carrier frequency component is demodulated by the demodulator 38, a data stream corresponding to each carrier signal is restored. Each data stream restored in the demodulator 38 is input to the P/S converter 40 to restore the transmission data d.

Through such a configuration, it is possible to improve the frequency use efficiency and achieve the improvement of communication quality without imposing a performance requirement for a high dynamic range upon a light-emitting device, and to significantly improve the communication quality. However, an increase in PAPR, peculiar to OFDM, is caused because respective carrier frequency components are added to each other in the front end of the driver circuit 22 of the transmission apparatus, and the light-emitting device 24 is driven based on the OFDM signals obtained through the addition. Accordingly, the performance requirement for a high dynamic range is imposed on the driver circuit 22, and the light-emitting device 24. For this reason, it is very difficult, in reality, to use the OFDM visible ray communication in a general illuminating device. Also, a driver circuit 22 or a light-emitting device 24 which can satisfy such performance requirements is expensive. This relates to an increase in the manufacturing cost of a transmitter. As described above, the difficulty in the use of a conventional infrastructure increases the installation cost. In the embodiments, which will be described later, the configurations of transmitters made in consideration of these problems will be proposed. The transmitters can remove the influence of a high PAPR caused by OFDM and reduce the performance requirement for the dynamic range of the driver circuit 22 and the light-emitting device 24.

<Embodiment>

Hereinafter, one embodiment of the present invention will be described. In the present embodiment, IFFT is not performed at a transmission-side, and for each carrier, a light-emitting device is directly driven. This is for reducing the performance requirements imposed on a driver circuit and a light-emitting device.

Configuration of a Visible Ray Communication System LS2

Figure 2:
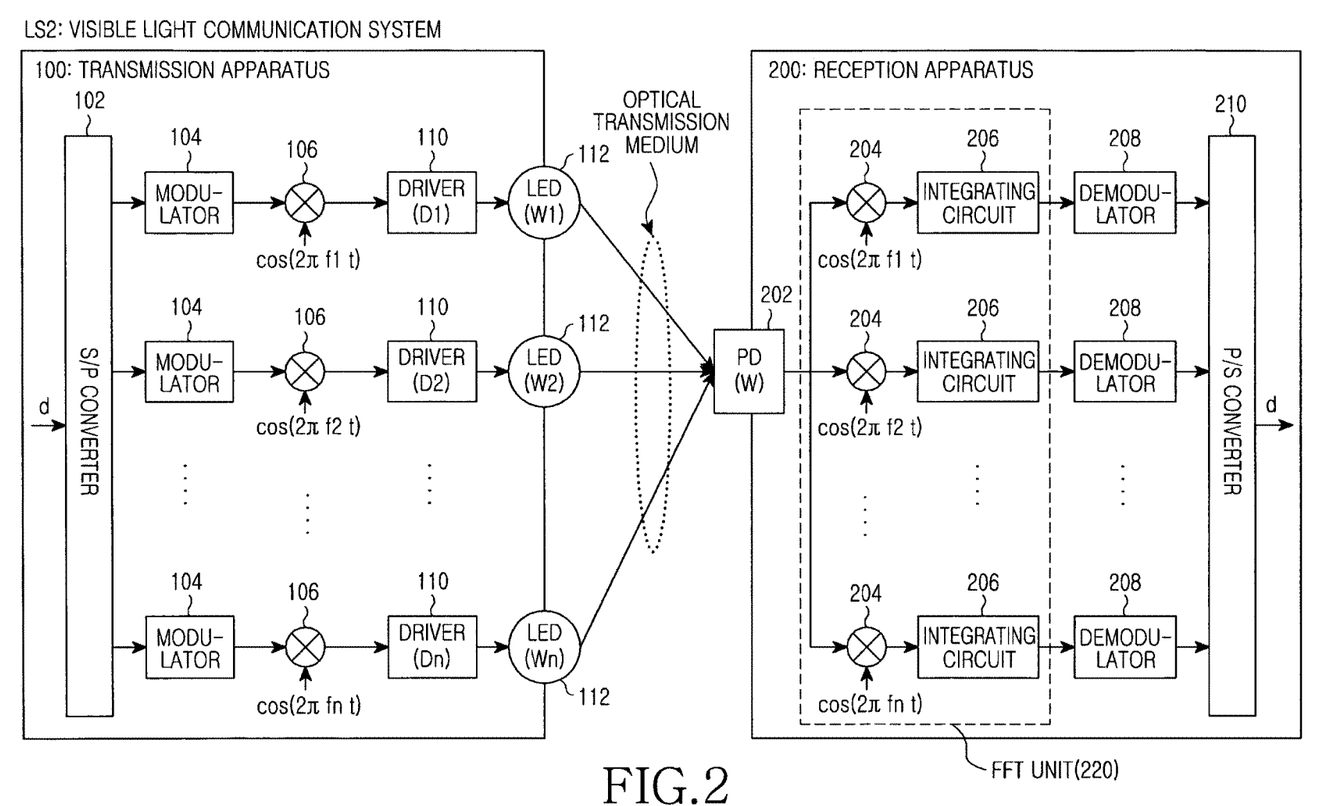
FIG. 2 illustrates an example of the configuration of a visible ray communication system according to one embodiment of the present invention.

First, the configuration of a visible ray communication system LS2 related to the present embodiment will be described with reference to FIG. 2. FIG. 2 illustrates an example of the configuration of a visible ray communication system LS2 according to the present embodiment.

As shown in FIG. 2, the visible ray communication system LS2 includes a transmission apparatus 100, and a reception apparatus 200. The transmission apparatus 100 has an S/P converter 102, a modulator 104, a driver circuit 110, a light-emitting device 112, and an IFFT unit 120 including a multiplier 106. The reception apparatus 200 has a light-receiving device 202, an FFT unit 220, a demodulator 208, and a P/S converter 210. Herein, the FFT unit 220 includes a multiplier 204 and an integrating circuit 206.

Transmission data d is converted from serial to parallel by the S/P converter 102. Then, from the S/P converter 102, data streams are output equal to the number of carriers. In the following description, the number of carriers is n. The data stream corresponding to each carrier, output from the S/P converter 102, is modulated with a pre-determined number of dimensions (for example, 2) by the modulator 104. The modulator 104 then outputs a modulated signal. The modulated signal of each carrier, output from the modulator 104, is input to the multiplier 106. In the multiplier 106, the modulated signal is multiplied by a carrier sinusoidal signal cos (2πf1t)~cos(2πfnt) corresponding to each of carrier frequencies f1~fn. Herein, n carrier sinusoidal signals corresponding to carrier frequencies f1~fn are orthogonal to each other.

Each modulated signal (hereinafter, a carrier signal), which has been multiplied by the carrier sinusoidal signal in the multiplier 106, is input to the driver circuit 110. The driver circuit 110 is provided in each light-emitting device 112 (LED(W1)~LED(Wn)), and is used to drive each light-emitting device 112 (LED(W1)~LED(Wn)). When the carrier signal is input, the driver circuit 110 controls the current quantity supplied to the light-emitting device 112 based on the input carrier signal, and emits the light of each light-emitting device 112 with the emission intensity according to the signal amplitude of the carrier signal. The light generated by each light-emitting device 112 is spatially multiplexed in a transmission medium, and is received by the light-receiving device 202 of the reception apparatus 200. The light-receiving device 202, for example, includes one Photo Diode (PD). When the light is received, an electrical signal (hereinafter, referred to as a reception signal) according to the intensity of the received light is output from the light-receiving device 202. The reception signal output from the light-receiving device 202 is input to the FFT unit 220. The FFT unit 220 is a device for performing FFT on the reception signal to extract each carrier frequency component.

The reception signal output from the light-receiving device 202 is input to the multiplier 204, and is multiplied by a carrier sinusoidal signal cos (2πf1t)~cos(2πfnt) corresponding to each of carrier frequencies f1~fn. The reception signal, which has been multiplied by each carrier sinusoidal signal in the multiplier 204, is input to the integrating circuit 206. In the integrating circuit 206, the signal output from the multiplier 204 is subjected to an integrating operation in an integration interval up to an OFDM symbol length (T) on a time axis, and a signal component corresponding to each of carrier frequencies f1~fn is extracted. Each carrier frequency component extracted from the integrating circuit 206 is input to the demodulator 208. Each carrier frequency component corresponds to each carrier signal. For this reason, when each carrier frequency component is demodulated by the demodulator 208, a data stream corresponding to each carrier signal is restored. Each data stream restored in the demodulator 208 is input to the P/S converter 210 to restore the transmission data d.

In the above-described configuration of the visible ray communication system LS2 according to the present embodiment, respective carrier signals corresponding to respective carrier frequencies are not added to each other in the front end of the driver circuit 110, and the light of each light-emitting device 112 is emitted with the emission intensity according to the signal amplitude of each carrier signal. As described above, since respective carrier signals are not added to each other in the front end of the driver circuit 110, a high PAPR (a problem in OFDM) is not caused, and a dynamic range required for the driver circuit 110 and the light-emitting device 112, corresponding to each carrier frequency, can be controlled to be low. As a result, by using a miniaturized and inexpensive LED driving circuit (or LED), the improvement of communication performance, similar to that achieved by OFDM, can be achieved. For example, a visible ray communication system capable of improving the frequency use efficiency and the endurance against multi-path by effectively utilizing a conventional infrastructure can be achieved.

Configuration of a Visible Ray Communication System LS3

Figure 3:
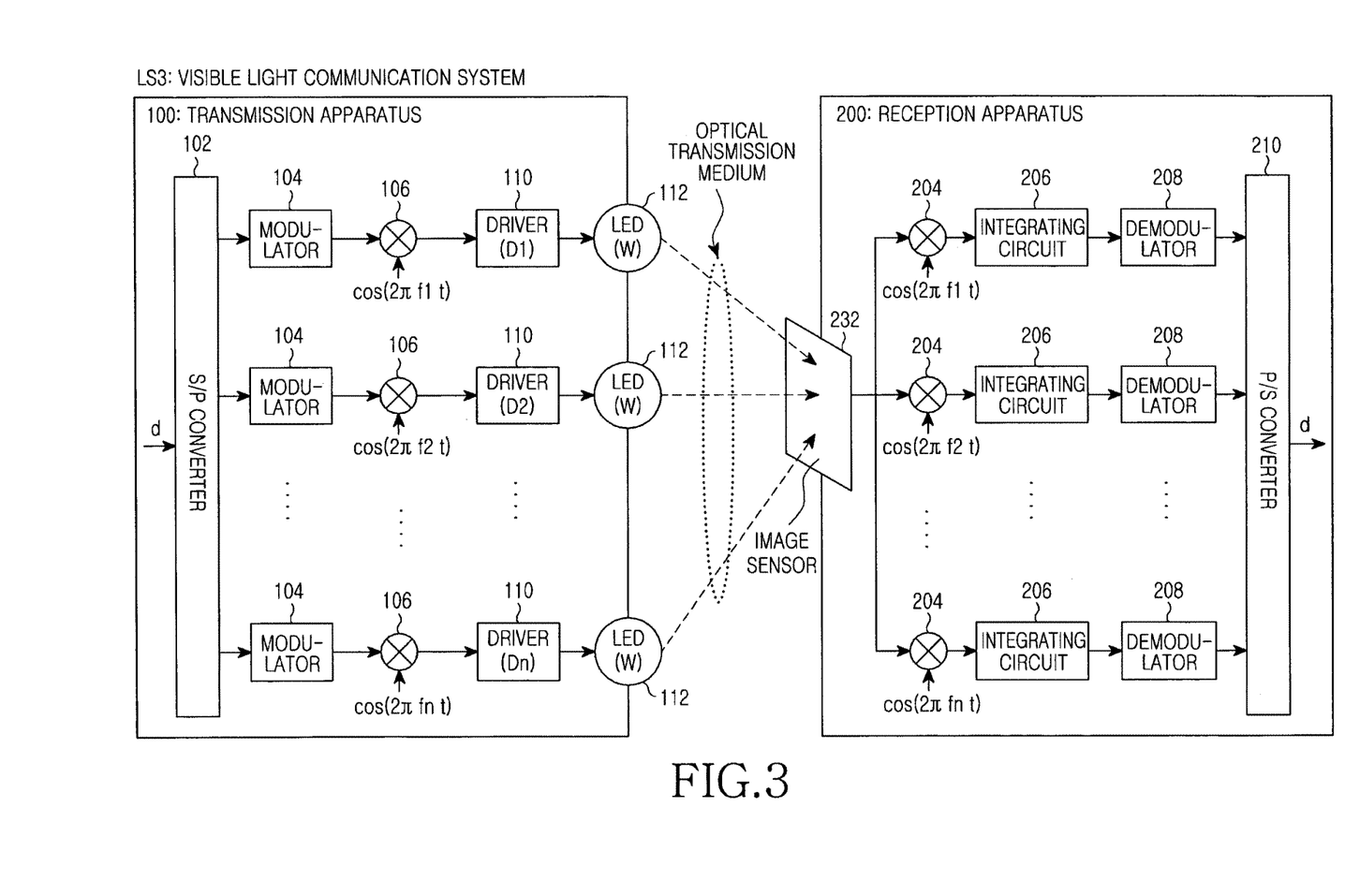
FIG. 3 illustrates an example of the configuration of a visible ray communication system according to a modified embodiment of FIG. 2.

Hereinafter, the configuration of a visible ray communication system LS3, that is, one modified embodiment of the visible ray communication system LS2 according to the present embodiment, will be described with reference to FIG. 3. FIG. 3 illustrates an example of the configuration of a visible ray communication system LS3 according to one modified embodiment of the present embodiment.

As shown in FIG. 3, the visible ray communication system LS3 includes a transmission apparatus 100, and a reception apparatus 200. The transmission apparatus 100 has an S/P converter 102, a modulator 104, a driver circuit 110, a light-emitting device 112, and an IFFT unit 120 including a multiplier 106. In other words, the configuration of the transmission apparatus 100 is the same as that of the visible ray communication system LS2. The reception apparatus 200 has an image sensor 232, an DFT unit, a demodulator 208, and a P/S converter 210. Herein, the DFT unit includes a multiplier 204 and an integrating circuit 206. As described above, the visible ray communication system LS3 is mainly different from the visible ray communication system LS2 in the light-receiving device of the reception apparatus 200. Therefore, the following description relates to the difference in the light-receiving device.

The image sensor 232 is a device for converting lights generated from a plurality of light-emitting devices 112 of the transmission apparatus 100 into reception signals. Herein, the image sensor 232 can specify each light-emitting device 112 according to the light-receiving position. For example, the image sensor 232 can specify the light received in the pixel of a position (X1,Y1) as the light emitted from the light-emitting device 112 (LED(W1)) of the transmission apparatus 100. In this manner, the light input to each pixel of the image sensor 232 is determined as the light emitted from each light-emitting device 112. For this reason, the image sensor 232 inputs the reception signal according to the reception intensity of the light emitted from each light-emitting device 112, to the DFT unit. The reason a Discrete Fourier Transform is used, instead of an FFT, for extracting a modulated signal of each carrier frequency is that in the output of the image sensor 232, signals has already been separated according to carrier frequencies. In the output of the image sensor 232, the DFT is performed, and according to the result, demodulation is performed in the demodulator 208. Also, serial-to-parallel conversion is performed in the P/S converter 210 to restore the transmission data d.

In the above-described configuration of the visible ray communication system LS3 according to one modified embodiment of the present embodiment, it is possible to control the dynamic range of the light-receiving device of the reception apparatus 200 to be low.

Configuration of a Visible Ray Communication System LS4

Figure 4:
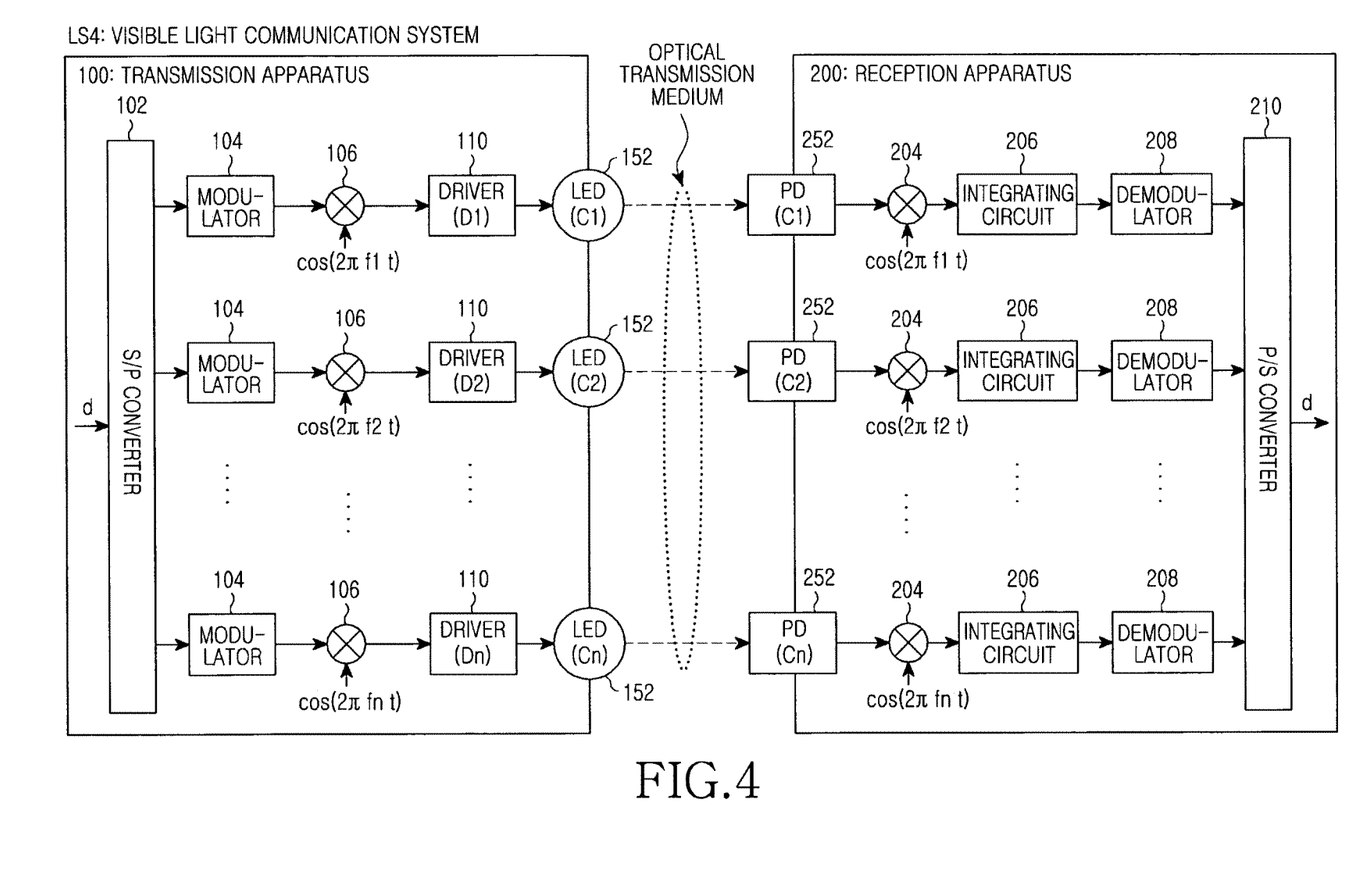
FIG. 4 illustrates an example of the configuration of a visible ray communication system according to a modified embodiment of FIG. 2.

Hereinafter, the configuration of a visible ray communication system LS4, that is, one modified embodiment of the visible ray communication system LS2 according to the present embodiment, will be described with reference to FIG. 4. FIG. 4 illustrates an example of the configuration of a visible ray communication system LS4 according to one modified embodiment of the present embodiment.

As shown in FIG. 4, the visible ray communication system LS4 includes a transmission apparatus 100, and a reception apparatus 200. The transmission apparatus 100 has an S/P converter 102, a modulator 104, a driver circuit 110, a light-emitting device 152, and an IFFT unit 120 including a multiplier 106. Herein, a plurality of light-emitting devices 152 provided in the transmission apparatus 100 of the present modified embodiment radiates with different colors (optical frequency of C1~Cn).

The reception apparatus 200 has a light-receiving device 252, an DFT unit, a demodulator 208, and a P/S converter 210. Herein, the DFT unit includes a multiplier 204, and an integrating circuit 206. As described above, the visible ray communication system LS4 is mainly different from the visible ray communication system LS2 in the light-emitting device of the transmission apparatus 100, and the light-receiving device of the reception apparatus 200. Therefore, the following description is on the difference in the device.

Like the visible ray communication system LS2, each light-emitting device 152 (LED(C1)~LED(Cn)) radiates with the emission intensity according to the signal amplitude of the carrier signal corresponding to each of carrier frequencies f1~fn. Herein, each light-emitting device 152 radiates lights with different colors (C1~Cn). It can be said that the present modified embodiment was made by combining the visible ray communication system LS2 of the present embodiment with a so-called Wave Length Division Multiplexing (WDM) technology, in that signals are allocated to respective colors C1~Cn to multiplex the transmission medium. The light generated by each light-emitting device 152 with a color of C1~Cn is received by each light-receiving device 252 with a color of C1~Cn in the reception apparatus 200. In the light-receiving device 252, a PD (a so-called color sensor) having a filter of a corresponding color may be used. For the signal output from the light-receiving device 252 of each color, DFT is performed in the DFT unit, demodulation is performed in the demodulator 208, and serial-to-parallel conversion is performed in the P/S converter 210 to restore the transmission data d.

In the above-described configuration of the visible ray communication system LS4 according to one modified embodiment of the present embodiment, it is possible to control the dynamic range of the light-receiving device of the reception apparatus 200 to be low. In the case of WDM, color interference caused by the optical frequency property of the light-emitting device 152, and the light-receiving device 252 is problematic. On the other hand, in the present modified embodiment, such color interference is improved because signals of respective colors can be separated from each other due to the orthogonality of an OFDM carrier. Accordingly, according to the present modified embodiment, it is possible to control the dynamic range required for the light-emitting device and the light-receiving device to be low while taking on the excellent communication property of OFDM, without consideration of the influence of color interference. As a result, it is possible to build a miniaturized and inexpensive visible ray communication system with a high degree of communication performance by using effectively using a conventional infrastructure.

Configuration of a Visible Ray Communication System LS5

Figure 5:
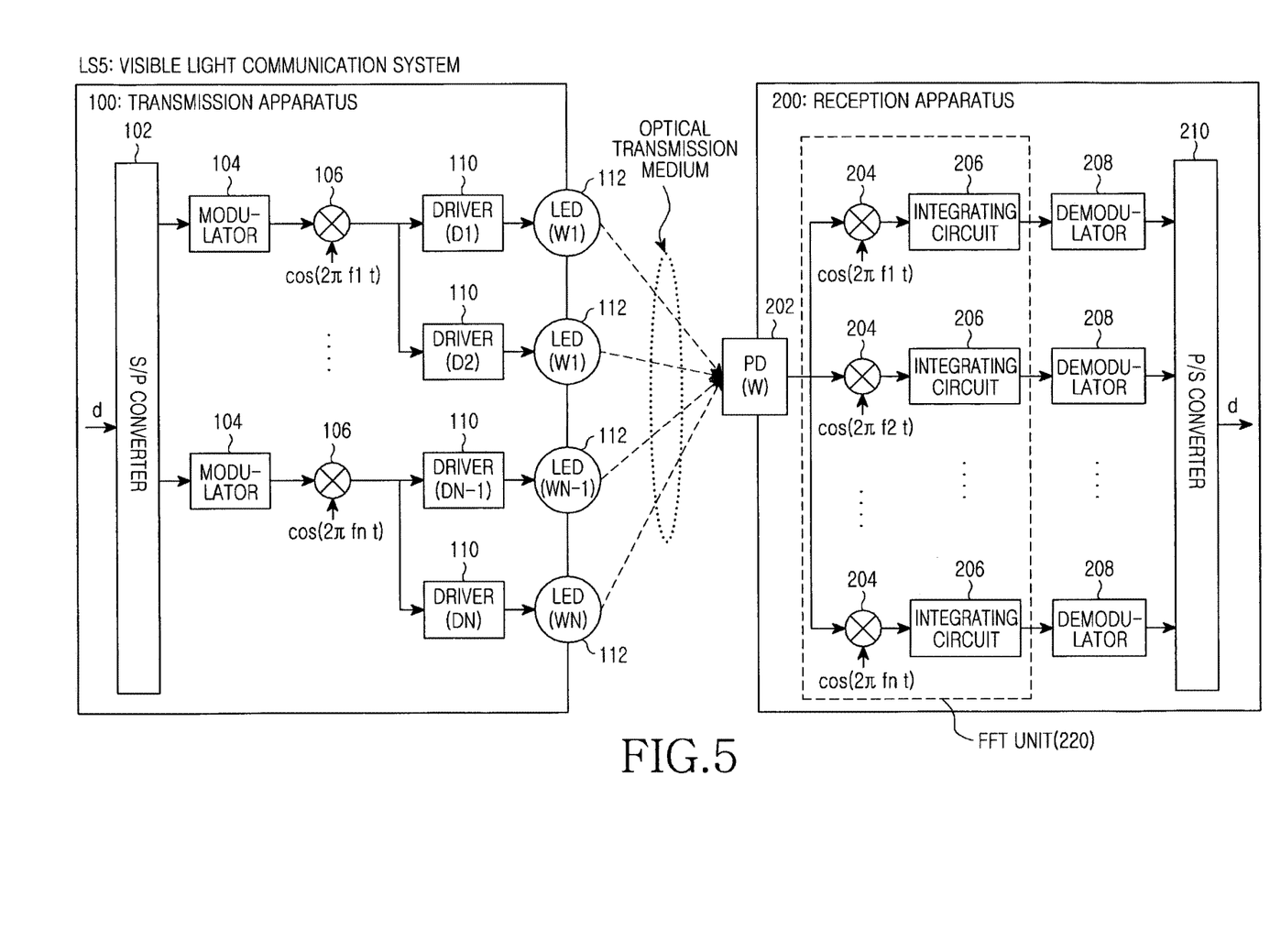
FIG. 5 illustrates an example of the configuration of a visible ray communication system according to a modified embodiment of FIG. 2.

Hereinafter, the configuration of a visible ray communication system LS5, that is, one modified embodiment of the visible ray communication system LS2 according to the present embodiment, will be described with reference to FIG. 5. FIG. 5 illustrates an example of the configuration of a visible ray communication system LS5 according to one modified embodiment of the present embodiment.

As shown in FIG. 5, the visible ray communication system LS5 includes a transmission apparatus 100, and a reception apparatus 200. The transmission apparatus 100 has an S/P converter 102, a modulator 104, a driver circuit 110, a light-emitting device 112, and an IFFT unit 120 including a multiplier 106. The visible ray communication system LS5 is different from the visible ray communication system LS2 in the number of the driver circuits 110 and the light-emitting devices 112. In particular, in the configuration in the present modified embodiment, the number N of the driver circuits 110 and the light-emitting devices 112 is higher than the number n of carrier signals (n<N). The configuration of the reception apparatus 200 is, in actuality, the same as that of the visible ray communication system LS2. As described above, the visible ray communication system LS5 is mainly different from the visible ray communication system LS2 in the light-emitting device of the transmission apparatus 100.

Transmission data d is converted from serial to parallel by the S/P converter 102. Then, from the S/P converter 102, data streams are output equal to the number of carriers. Herein, the number of carriers is n. The data streams corresponding to each carrier, output from the S/P converter 102, are modulated with a pre-determined number of dimensions (for example, 2) by the modulator 104. Then, from the modulator 104, a modulated signal is output. The modulated signal of each carrier, output from the modulator 104, is input to the multiplier 106. In the multiplier 106, the modulated signal is multiplied by a carrier sinusoidal signal cos (2πf1t)~cos(2πfnt) corresponding to each of carrier frequencies f1~fn. Herein, n carrier sinusoidal signals corresponding to carrier frequencies f1~fn are orthogonal to each other.

The steps described so far are the same in those of the visible ray communication system LS2. However, the carrier signals output from the multiplier 106 are input to a plurality of driver circuits 110. For example, the carrier signal, which has been multiplied by the carrier sinusoidal signal cos (2πf1t) in the multiplier 106, is branched and input to two driver circuits 110 (D1, D2). The driver circuit 110 is provided in each light-emitting device 112 (LED(W1)~LED (WN)), and is used to drive each light-emitting device 112 (LED(W1)~LED(WN)). When the carrier signal is input, the driver circuit 110 controls the current quantity supplied to the light-emitting device 112 based on the input carrier signal, and emits the light of each light-emitting device 112 with the emission intensity according to the signal amplitude of the carrier signal. This characteristic is the same as the visible ray communication system LS2. However, the visible ray communication system LS5 is different from the visible ray communication system LS2 in that the radiation of a plurality of light-emitting devices 112 is controlled based on the same carrier signal. Through this configuration, the technology according to this embodiment can be preferably applied the case where the number N of the light-emitting devices 112 is higher than the number n of carrier signals (n<N).

In the above-described configuration of the visible ray communication system LS5 according to one modified embodiment of the present embodiment, respective carrier signals corresponding to respective carrier frequencies are not added to each other in the front end of the driver circuit 110, and the light of each light-emitting device 112 is emitted with the emission intensity according to the signal amplitude of each carrier signal. This property is the same as the case where the number N of the light-emitting devices 112 is higher than the number n of carrier signals (n<N). Accordingly, since respective carrier signals are not added to each other in the front end of the driver circuit 110, a high PAPR (a problem in OFDM) is not caused, and a dynamic range required for the driver circuit 110 and the light-emitting device 112, corresponding to each carrier frequency, can be controlled to be low. As a result, by using a miniaturized and inexpensive LED driving circuit (or LED), the improvement of communication performance, similar to that achieved by OFDM, can be achieved.

Configuration of a Visible Ray Communication System LS6

Figure 6:
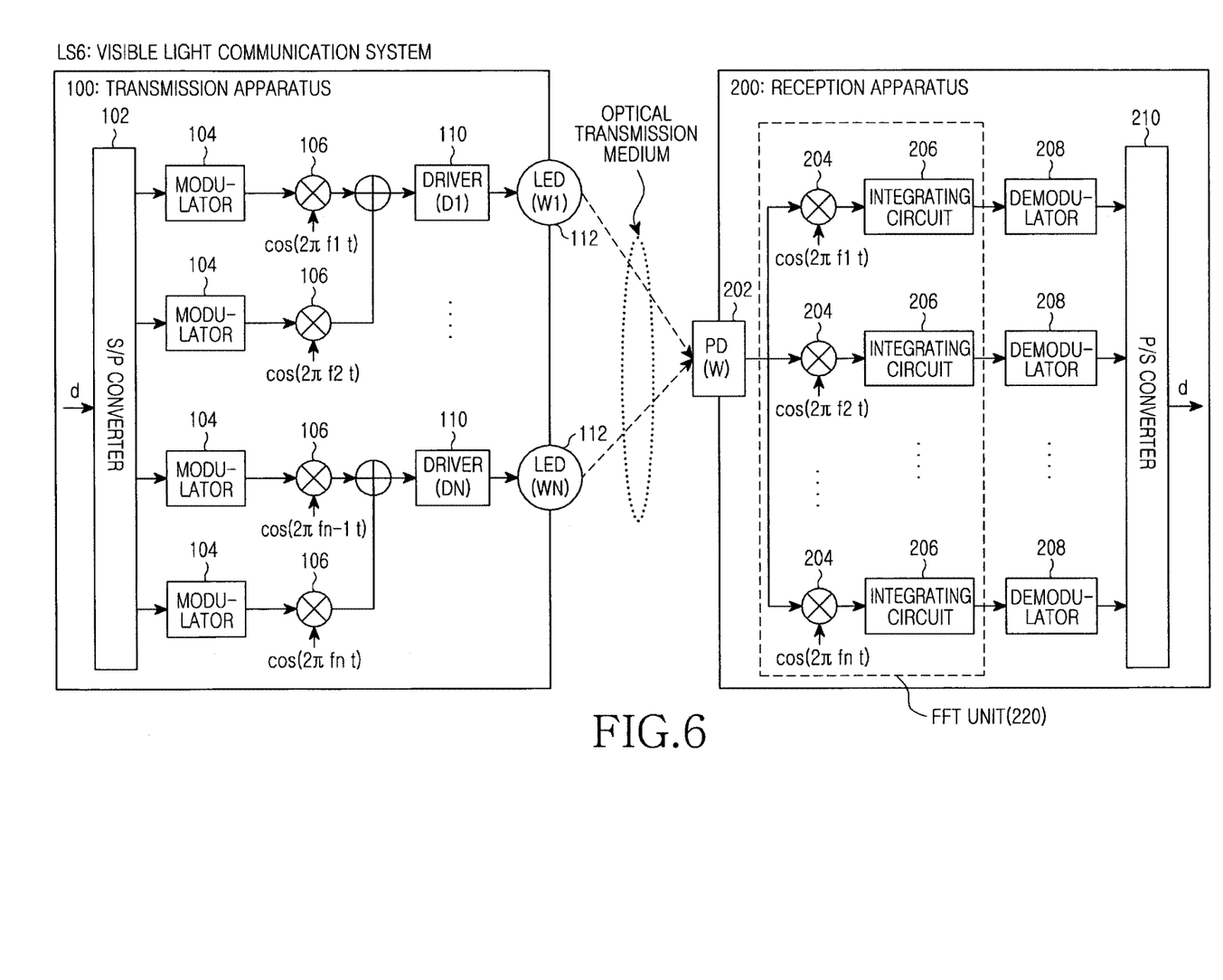
FIG. 6 illustrates an example of the configuration of a visible ray communication system according to a modified embodiment of FIG. 2.

Hereinafter, the configuration of a visible ray communication system LS6, that is, one modified embodiment of the visible ray communication system LS2 according to the present embodiment, will be described with reference to FIG. 6. FIG. 6 illustrates an example of the configuration of a visible ray communication system LS6 according to one modified embodiment of the present embodiment.

As shown in FIG. 6, the visible ray communication system LS6 includes a transmission apparatus 100, and a reception apparatus 200. The transmission apparatus 100 has an S/P converter 102, a modulator 104, a driver circuit 110, a light-emitting device 112, and an IFFT unit 120 including a multiplier 106. The visible ray communication system LS6 is different from the visible ray communication system LS2 in the number of the driver circuits 110 and the light-emitting devices 112. In particular, in the configuration in the present modified embodiment, the number N of the driver circuits 110 and the light-emitting devices 112 is lower than the number n of carrier signals (n>N). Also, unlike the visible ray communication system LS2, the visible ray communication system LS6 includes an adder provided at the rear end of the multiplier 106. The visible ray communication system LS6 has, in actuality, the same configuration of the reception apparatus 200 as that of the visible ray communication system LS2. As described above, the visible ray communication system LS6 is mainly different from the visible ray communication system LS2 in the light-emitting device of the transmission apparatus 100.

Transmission data d is converted from serial to parallel by the S/P converter 102. Then, from the S/P converter 102, data streams are output equal to the number of carriers. Herein, the number of carriers is n. The data stream corresponding to each carrier, output from the S/P converter 102, is modulated with a pre-determined number of dimensions (for example, 2) by the modulator 104. Then, from the modulator 104, a modulated signal is output. The modulated signal of each carrier, output from the modulator 104, is input to the multiplier 106. In the multiplier 106, the modulated signal is multiplied by a carrier sinusoidal signal cos (2πf1t)~cos(2πfnt) corresponding to each of carrier frequencies f1~fn. Herein, n carrier sinusoidal signals corresponding to carrier frequencies f1~fn are orthogonal to each other.

The steps described so far are the same in those of the visible ray communication system LS2. However, the carrier signals output from a plurality of multipliers 106 are added to each other by being input to the adder, and then input to the driver circuit 110. For example, the carrier signal, which has been multiplied by the carrier sinusoidal signal cos (2πf1t) in the multiplier 106, and the carrier signal, which has been multiplied by the carrier sinusoidal signal cos (2πf2t) in the multiplier 106, are added to each other by being input to the adder, and input to the driver circuit 110 (D1). The driver circuit 110 is provided in each light-emitting device 112 (LED(W1)~LED(WN)), and is used to drive each light-emitting device 112 (LED(W1)~LED(W N)). When the carrier signal is input, the driver circuit 110 controls the current quantity supplied to the light-emitting device 112 based on the input carrier signal, and emits the light of each light-emitting device 112 with the emission intensity according to the signal amplitude of the carrier signal. This characteristic is the same as the visible ray communication system LS2. However, unlike the visible ray communication system LS2, in the visible ray communication system LS6, the radiation of each light-emitting device 112 is controlled based on the added carrier signals 112. Through this configuration, the technology according to this embodiment can be preferably applied the case where the number N of the light-emitting devices 112 is lower than the number n of carrier signals (n>N).

In the above-described configuration of the visible ray communication system LS6 according to one modified embodiment of the present embodiment, respective carrier signals corresponding to respective carrier frequencies are not added to each other in the front end of the driver circuit 110, and also, after the addition of some carrier signals, the light of each light-emitting device 112 is emitted with the emission intensity according to the signal amplitude of each carrier signal. Accordingly, since respective carrier signals are not added to each other in the front end of the driver circuit 110, a high PAPR (a problem in OFDM) is not caused, and a dynamic range required for each driver circuit 110 and each light-emitting device 112 can be controlled to be low. As a result, by using a miniaturized and inexpensive LED driving circuit (or LED), the improvement of communication performance, similar to that achieved by OFDM, can be achieved.

In the above description, as a light-emitting device, an LED is used. However, besides the LED, various devices, such as a semiconductor light-emitting device (e.g., LD, SLD), a fluorescent lamp, a Braun tube (CRT), a display device, a Plasma Display Device (PDP), an organic ElectroLuminescent (EL) display device, a liquid crystal monitor (LCD) device, may be used as the light-emitting device.

As described above, according to the present invention, it is possible to achieve the improvement of communication quality, similar to that achieved by OFDM, without imposing the performance requirement for a high dynamic range upon a light-emitting device. As a result, it is possible to achieve a transmission apparatus, and a visible ray communication system, which are convenient and inexpensive, and have a high degree of communication performance, similar to that achieved by OFDM.

Although embodiments of the present invention have been illustrated with reference to the accompanying drawings, it will be understood that the present invention is not limited to the embodiments disclosed. Accordingly, it will be appreciated by those skilled in the art that various changes and modifications may be made within the scope of the appended claims. Such changes and modifications will be apparent to those skilled in the art without departing from the spirit and scope of the present invention.

While the invention has been shown and described with reference to certain embodiments thereof, it will be understood by those skilled in the art that various changes in form and details may be made therein without departing from the spirit and scope of the invention as defined by the appended claims and their equivalents.

The invention claimed is:

1. A transmission apparatus, comprising:
a plurality of light-emitting devices;
a Serial-to-Parallel (S/P) converter configured to Serial-to-Parallel convert transmission data into N data streams;
one or more modulators configured to modulate carriers corresponding to each of the N data streams into N modulated signals;
one or more carrier signal multipliers configured to generate N transmission signals by multiplying each of the N modulated signals by each of N carrier signals, wherein each of the N carrier signals is orthogonal to each of the N modulated signals; and
one or more drivers configured control current quantity supplied to the plurality of light-emitting devices according to signal amplitudes for each of the N transmission signals.

2. The transmission apparatus of claim 1, wherein emission intensity for each of the plurality of light-emitting devices is determined based on signal amplitude for each of the N transmission signals.

3. The transmission apparatus of claim 1, wherein, when a number N of the plurality of the light-emitting devices is greater than a number n of the one or more carrier signals (N>n), each of the n carrier signal is inputted to at least two different drivers, and at least two transmission signals corresponding to each of the n carrier signals are generated by the one or more drivers.

4. The transmission apparatus of claim 1, wherein the one or more drivers are further configured to:
when a number N of the plurality of the light-emitting devices is less than a number n of the one or more carrier signals (N<n), adds M (2≤M <n) signals of the N transmission signals each other, and
illuminate the plurality of the light-emitting devices based on transmission signals obtained through the addition.

5. A method for visible ray communication, comprising:
Serial-to-Parallel converting transmission data into N data streams;
modulating carriers corresponding to each of the N data streams into N modulated signals;
generating N transmission signals by multiplying each of the N modulated signals by each of N carrier signals, wherein each of the N carrier signals is orthogonal to each of the N modulated signals; and
controlling current quantity supplied to a plurality of light-emitting devices according to signal amplitudes for each of the N transmission signals.

6. The method of claim 5, wherein emission intensity for each of the plurality of light-emitting devices is determined based on signal amplitude for each of the N transmission signals.

7. The method of claim 5, wherein when a number N of the plurality of the light-emitting devices is greater than a number n of the one or more carrier signals (N>n), at least two transmission signals corresponding to each of the n carrier signal are generated.

8. The method of claim 5, wherein,
when a number N of the plurality of the light-emitting devices is less than a number n of the one or more carrier signals (N<n), M (2≤M<n) signals of the N transmission signals are added each other, and the plurality of the light-emitting devices are illuminated based on transmission signals obtained through the addition.

* * * * *